United States Patent Office 3,291,538
Patented Dec. 13, 1966

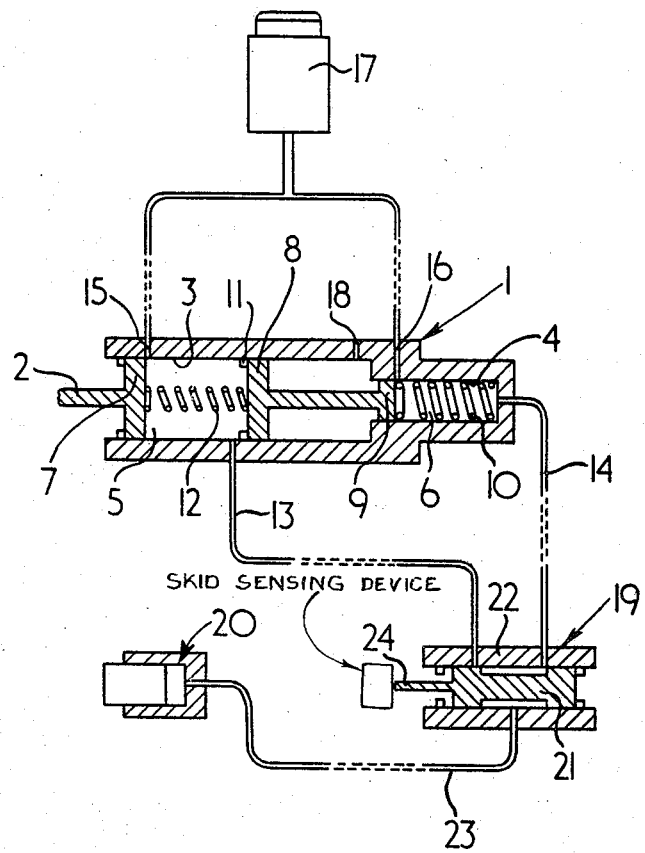

3,291,538
VEHICLE ANTI-SKID BRAKING SYSTEMS
Douglas Bulgin, Birmingham, England, assignor to Dunlop Rubber Company Limited, London, England, and Fort Dunlop, Erdington, Birmingham, England, a corporation of Great Britain
Filed Aug. 27, 1965, Ser. No. 483,206
Claims priority, application Great Britain, Sept. 10, 1964, 37,015/64
6 Claims. (Cl. 303—21)

This invention relates to vehicle anti-skid braking systems.

The object of the present invention is to provide an effective and reasonably inexpensive anti-skid braking system, particularly, but not exclusively, for road vehicles.

According to one aspect of the invention an anti-skid braking system for a vehicle wheel comprises a first source of pressurised fluid and a second source of pressurised fluid at a lower pressure than that of the fluid from the first source, means for suppling fluid from the first source to a brake operating mechanism to apply an associated brake, a skid-sensing device, and control means operated by the skid-sensing device to interrupt the supply of fluid from the first source to the brake operating mechanism and to permit fluid to be supplied to the brake operating mechanism only from the second source whenever a skid occurs or is imminent.

The skid-sensing device may be of the rotary inertia type or of any other suitable type for sensing wheel deceleration, or may alternatively be of the kind which is responsive to deceleration of the vehicle or to the transverse accelerations of the vehicle which occur on cornering. The system in accordance with the invention operates to substitute a lower pressure for the pressure initially supplied to the brake whenever conditions arise which would tend to cause the associated wheel or wheels of the vehicle to lock and skid.

According to a further aspect of the invention an anti-skid braking system for a vehicle wheel comprises a brake associated with the wheel and having an operating mechanism operable by hydraulic pressure, a master-cylinder assembly having a pair of fluid-pressurising chambers arranged to develop respectively a relatively high and a relatively low pressure on simultaneous operation thereof and provided with independent fluid connections to a control valve arranged selectively to connect either of the said chambers to the brake operating mechanism, the control valve being normally arranged to connect the high pressure chamber to the brake operating mechanism, and a skid-sensing device arranged to actuate the control valve to interrupt the supply of fluid to the brake operating mechanism from the high-pressure chamber during any period when the wheel is locked or when a skid is imminent and to connect the low-pressure chamber to the brake operating mechanism during the said period.

One embodiment of the invention will now be described, with reference to the accompanying drawing, which is a diagrammatic cross-sectional view of an anti-skid braking system.

The vehicle braking system shown in the drawing comprises a tandem hydraulic master cylinder assembly 1 for actuation by a driver's foot pedal (not shown) through a push rod 2. The assembly 1 comprises two coaxial cylinders 3 and 4 of different diameters, which form, respectively, a low-pressure chamber 5 and a high-pressure chamber 6. The push rod 2 is connected to a piston 7 which is slidable in the cylinder 3 to apply pressure to fluid contained in the chamber 5; a second piston 8 is slidable in the cylinder 3 and is rigidly connected to a third piston 9 which is slidable in the cylinder 4.

A compression spring 10 is provided in the cylinder 4 to urge the pistons 8 and 9 towards the position shown, with the piston 8 in contact with an abutment 11. A second spring 12 is provided to oppose movement of the first piston 7 towards the second piston 8.

The master-cylinder assembly is provided with an outlet connection 13 for fluid from the low-pressure chamber 5 and an outlet connection 14 for fluid from the high-pressure chamber 6. Recuperation and vent openings 15 and 16 are provided, respectively, in the cylinders 3 and 4 and are connected to a common fluid reservoir 17. An air vent 18 is formed in the wall of the master-cylinder assembly to ensure free movement of the piston 8 in the cylinder 3.

The outlet connections 13 and 14 form independent hydraulic lines which connect the high-pressure and the low-pressure chambers to a control valve 19 associated with a brake operating mechanism 20 of a brake for a wheel of the vehicle. The brake may be of any conventional hydraulically operated design, either a drum brake or a disc brake. The valve 19 comprises a spool valve member 21 slidable in a cylinder 22 and arranged to connect either the line 13 or the line 14 to a hydraulic line 23 through which fluid can pass to or from the brake operating mechanism 20.

The member 21 is normally arranged as shown in the drawing, with the high-pressure line 14 connected to the brake operating mechanism 20. A rod 24 connects the member 21 to a skid-sensing device (not shown) associated with the wheel and arranged when a skid occurs or is imminent to move the member 21 to a position in which it interrupts the connection between the line 14 and the brake operating mechanism 20, and establishes a connection between the line 13 and the brake operating mechanism.

In operation, the system is initially in the state shown in the drawing. When the driver presses his brake pedal the rod 2 moves the piston 7 towards the piston 8. Since the outlet from the chamber 5 is sealed by the valve 19 the fluid in the chamber cannot escape, and moves the piston 8 through an equal distance, applying a thrust to the piston 9 which is substantially equal to that applied to the piston 8. The pressure generated in the high pressure cylinder 6 is fed to the brake operating mechanism by the valve 19.

When the skid-sensing device operates to change the position of the valve member 21 the brake operating mechanism 20 is connected to the low-pressure chamber 5 instead of the high-pressure chamber 6. Since the piston 8 is of larger diameter than the piston 9, and since equal thrusts are applied to the pistons, the pressure in the chamber 5 is considerably lower than that in the chamber 6 and thus lower than that in the brake operating mechanism 20, and fluid tends to return from the brake operating mechanism into the chamber 5, thus releasing or partially releasing the brake. The system remains in this state until the tendency for the wheel to lock has been overcome, when the valve member 21 moves back to the position shown in the drawing and again allows fluid to pass from the high-pressure chamber 6 to the brake. Should this again cause the wheel to lock, the valve 19 again changes the connections to interrupt the supply of fluid from the high pressure chamber, excess fluid being returned to the low-pressure chamber The above process continues until the tendency to skid does not recur or until the brakes are released by the driver, or until the piston 9 has moved sufficiently to compress the spring 10 to its maximum extent, at which point only the pressure in the low-pressure chamber is available to operate the brake.

The effect of the spring 10 is to reduce the pressure of the fluid in the high-pressure chamber progressively as the piston 9 moves along the cylinder 4, the increased load required to compress the spring taking an increasing share of the total thrust acting on the piston 9. This causes each succeeding application of the brake by the fluid from the high-pressure cylinder under the control of the valve 19 to be at a lower pressure than the previous application, and thus helps to reduce the pressure automatically to a level which will not cause a skid to develop.

At the same time, the fluid returning to the low-pressure cylinder 5 causes the volume contained between the pistons 7 and 8 to be increased and thus to permit the spring 12 to extend in length. As in the case of the spring 10 contained in the high pressure cylinder, the spring 12 provides a thrust which effectively reduces the pressure of fluid in the cylinder 3, and since the spring 12 is allowed to extend each time the valve 19 operates to check a skid, the pressure of fluid in the low-pressure chamber 5 rises with each operation of the control valve 19.

If the tendency for the wheel to skid has not been finally overcome before the point has been reached at which no more fluid can be supplied from the high-pressure cylinder, the pressure of the fluid in the brake-operating mechanism remains at substantially the same value as that of the fluid in the low-pressure cylinder. This pressure will have increased during the period of operation of the system since the initial application of the brake, and by this time it is reasonable to expect that the vehicle's speed will have been reduced, and the coefficient of friction of the tyres on the road correspondingly increased sufficiently for the increased pressure to provide a higher level of braking without causing a skid to develop.

The areas of the pistons 8 and 9, and the stiffnesses of the springs 10 and 12 are chosen to provide optimum braking performance for the type and weight of vehicle to which the system is fitted.

The system may be actuated by a skid-sensing device of the rotary-inertia type, which operates the valve 19 whenever the rate of deceleration of the associated wheel exceeds a predetermined value; alternatively, a governor-type device may be used to operate the valve whenever the wheel locks and ceases to rotate or whenever the rate of rotation of the wheel drops below a predetermined level. In alternative systems in accordance with the invention the control valve can be operated electrically by current produced by a simple electrical generator built into the wheel, or by a magnetic system operated by eddy current drag produced in a non-rotatably mounted conductor by a magnetic component mounted to rotate with the wheel.

The system may be employed to provide independent control of each wheel brake of a vehicle by providing a separate control valve and skid-sensing device for each wheel, or the system may be controlled by a single skid-sensing device associated with one wheel of the vehicle.

The system may be operated by the driver of the vehicle without power assistance or a conventional servo device may be employed to assist the effort applied by the driver to the push rod 2.

In the system according to the invention, the control valve will normally be situated in close proximity to the brake operating cylinder, and the rate at which the system responds to the skid-sensing device will thus be very rapid, the resulting cyclical application and release of braking pressure producing an improved braking effect.

Having now described my invention—what I claim is:

1. In combination with a brake associated with a rotatable vehicle wheel, an anti-skid braking system comprising a fluid pressure operating mechanism, a master cylinder assembly having a pair of fluid-pressurising chambers arranged to develop respectively a relatively high and a relatively low pressure on simultaneous operation thereof and provided with independent fluid connections to a control valve arranged selectively to connect either of the said chambers to the brake operating mechanism, the control valve being normally arranged to connect the high pressure chamber to the brake operating mechanism, and a skid-sensing device arranged to actuate the control valve to interrupt the supply of fluid to the brake operating mechanism from the high-pressure chamber during any period when the wheel is locked or when a skid is imminent and to connect the low-pressure chamber to the brake operating mechanism during the said period.

2. An anti-skid braking system according to claim 1 wherein the master cylinder assembly comprises two cylinders of different diameters, a first piston slidable in the cylinder of larger diameter to apply pressure to fluid contained in a low-pressure chamber formed therein, a second piston slidable in the cylinder of larger diameter and a third piston slidable in the cylinder of smaller diameter, the second piston being arranged to transmit a thrust to the third piston to generate fluid pressure in a high-pressure chamber formed within the cylinder of smaller diameter.

3. An anti-skid braking system according to claim 2 wherein the cylinders are coaxial, the first piston being arranged to receive pressure from a driver's foot pedal and the second and third pistons being connected to move together under pressure from the fluid in the low-pressure chamber.

4. An anti-skid braking system according to claim 2 wherein a spring is provided to oppose fluid-pressurising movement of the third piston.

5. An anti-skid braking system according to claim 4 wherein a second spring is provided to oppose movement of the first piston towards the second piston.

6. An anti-skid braking system according to claim 1 wherein the control valve is a spool valve arranged to be actuated mechanically by the skid-sensing device.

References Cited by the Examiner

UNITED STATES PATENTS

| | | | |
|---|---|---|---|
| 2,753,017 | 7/1956 | Curl et al. | 188—181 |
| 2,826,278 | 3/1958 | Highley | 188—181 |

EUGENE G. BOTZ, *Primary Examiner.*